United States Patent
Droesbeke et al.

(10) Patent No.: US 9,213,145 B2
(45) Date of Patent: Dec. 15, 2015

(54) CABLE GUIDE BOOT ASSEMBLY

(75) Inventors: Gert Droesbeke, Saint-Vit (FR);
Sivakumar Paulpandian, Tamilnadu (IN)

(73) Assignee: FCI Asia PTE, Ltd., Singapore (SG)

( * ) Notice: Subject to any disclaimer, the term of this patent is extended or adjusted under 35 U.S.C. 154(b) by 0 days.

(21) Appl. No.: 14/004,923

(22) PCT Filed: Apr. 4, 2012

(86) PCT No.: PCT/EP2012/056158
§ 371 (c)(1),
(2), (4) Date: Sep. 13, 2013

(87) PCT Pub. No.: WO2012/136702
PCT Pub. Date: Oct. 11, 2012

(65) Prior Publication Data
US 2013/0343706 A1    Dec. 26, 2013

(51) Int. Cl.
*G02B 6/38* (2006.01)
*G02B 6/46* (2006.01)
*H01R 13/56* (2006.01)
*G02B 6/44* (2006.01)

(52) U.S. Cl.
CPC *G02B 6/38* (2013.01); *G02B 6/381* (2013.01); *G02B 6/4478* (2013.01); *G02B 6/46* (2013.01); *H01R 13/562* (2013.01); *Y10T 29/49826* (2015.01)

(58) Field of Classification Search
CPC ........ G02B 6/0006; G02B 6/04; G02B 6/125; G02B 6/1228; G02B 6/241; G02B 6/262; G02B 6/38; G02B 6/3807; G02B 6/3809; G02B 6/4292; G02B 6/381; G02B 6/46; A61B 1/00126; A61B 1/061; A61B 1/064; A61B 1/07; A61B 1/0084; A61B 1/228; A61B 1/233; A61B 1/6851; H01R 13/562
USPC ................. 385/50–58, 62, 66, 75–78, 81, 84, 385/136–139, 87–88, 902; 439/445
See application file for complete search history.

(56) References Cited

U.S. PATENT DOCUMENTS

| 1,965,151 A | 7/1934 | Mueller |
| 6,932,515 B2 | 8/2005 | Ngo ............................... 385/76 |
| 2002/0150352 A1* | 10/2002 | Ngo ............................... 385/86 |
| 2004/0121646 A1 | 6/2004 | Iamartino et al. ............. 439/445 |

FOREIGN PATENT DOCUMENTS

EP    1 251 379 A2    4/2002

* cited by examiner

*Primary Examiner* — Akm Enayet Ullah
*Assistant Examiner* — Michael Mooney
(74) *Attorney, Agent, or Firm* — Harrington & Smith

(57) ABSTRACT

A cable guide boot assembly for attachment to a connector and guiding a cable is provided, including a boot portion and a connector portion. The connector portion is configured to be non-rotary fixed to the connector and to extend from the connector in a first direction relative to a mating direction of the connector, and includes a first connection portion having a non-circular circumferential shape relative to the first direction. The boot portion a second connection portion mated to the first connection portion. The second connection portion is configured to receive the first connection portion, such that the boot portion is attachable to the connector portion in a discrete number of twisting angles with respect to the first relative direction.

13 Claims, 9 Drawing Sheets

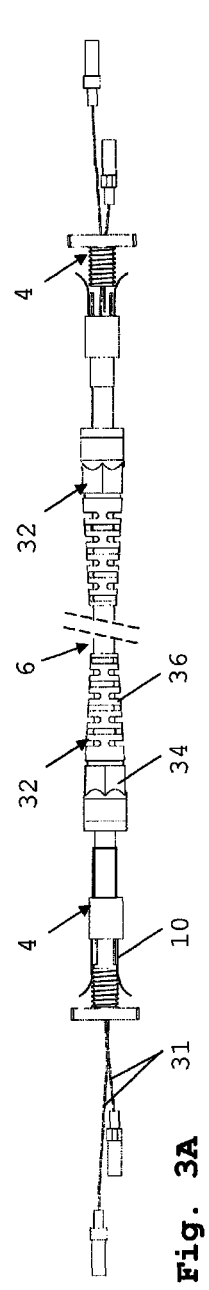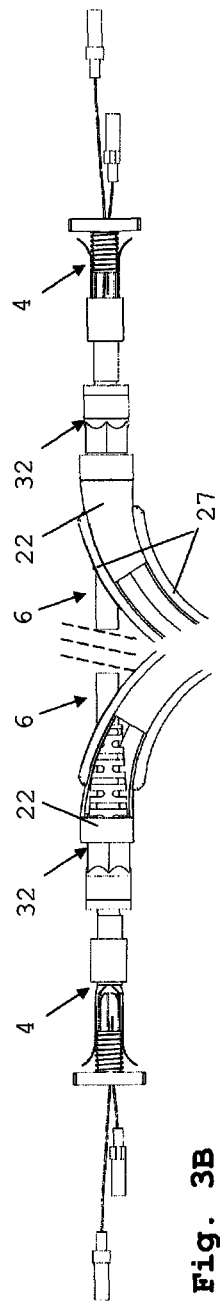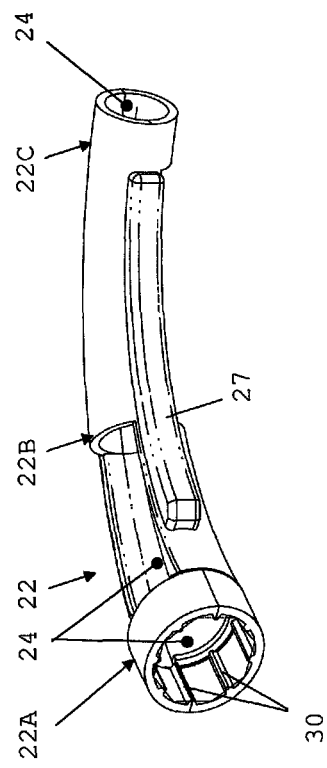
Fig. 3A
Fig. 3B
Fig. 3C

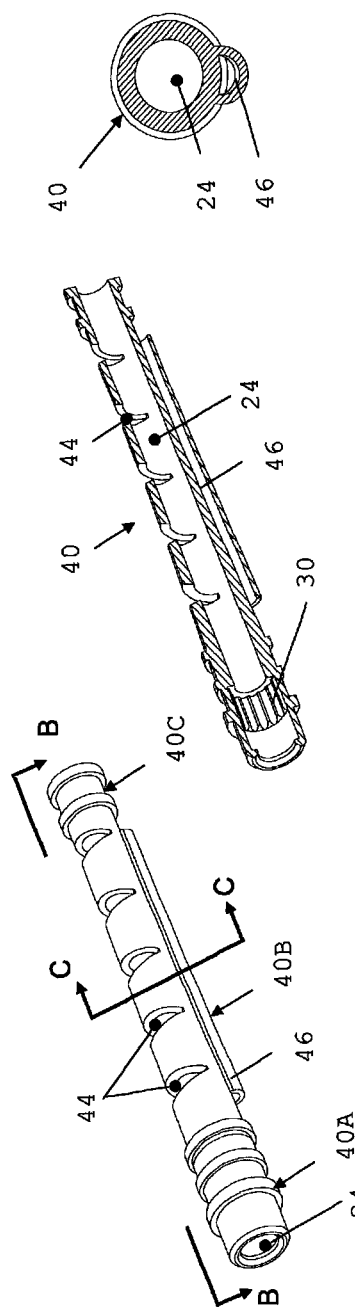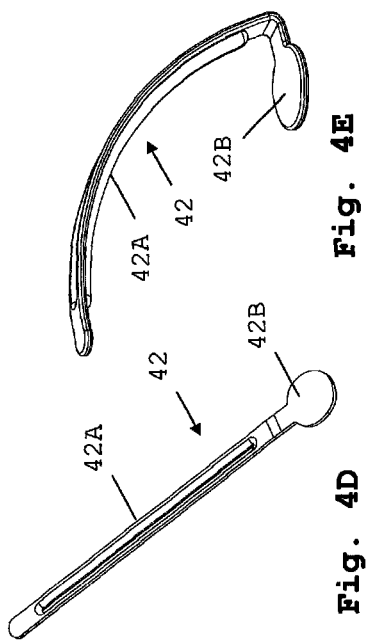

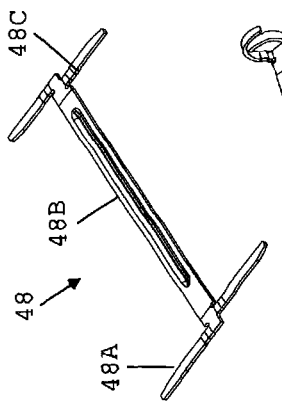
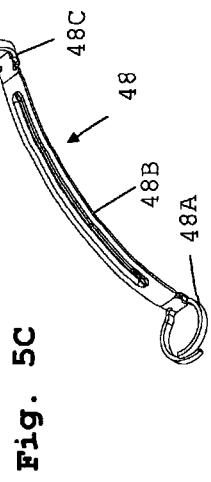
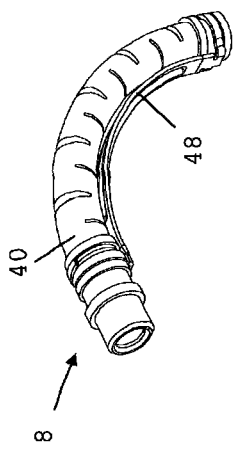
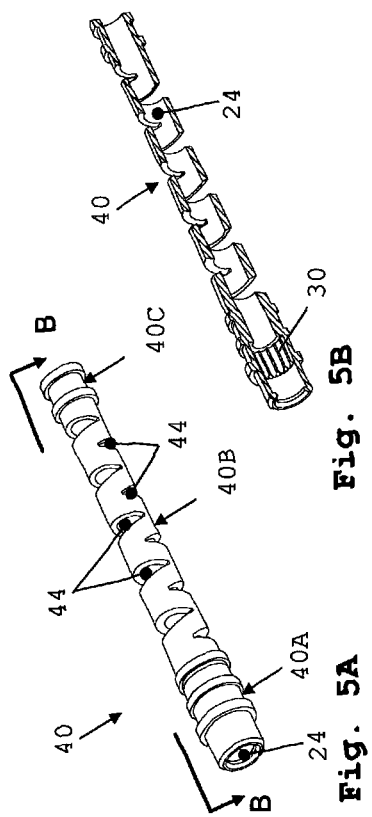
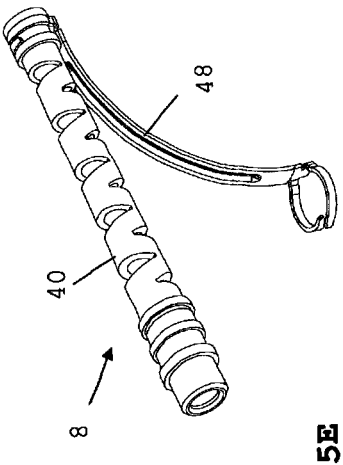

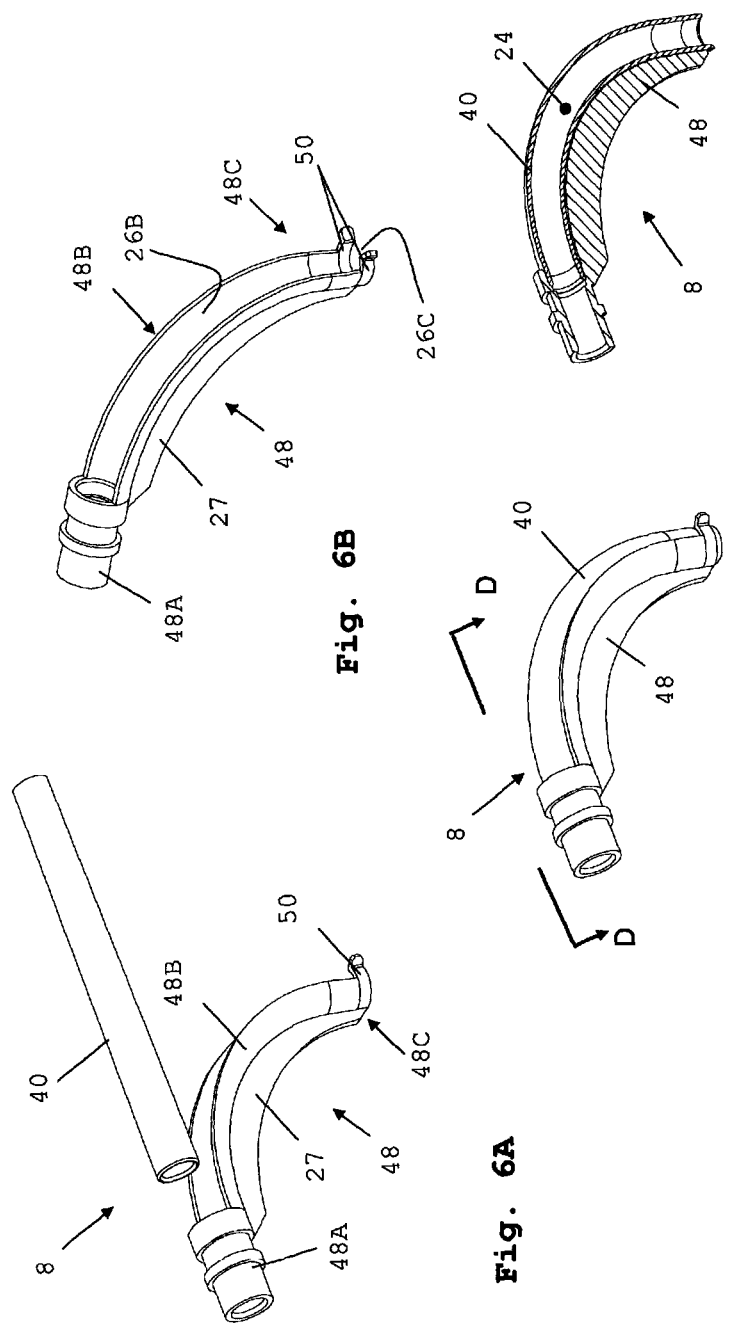

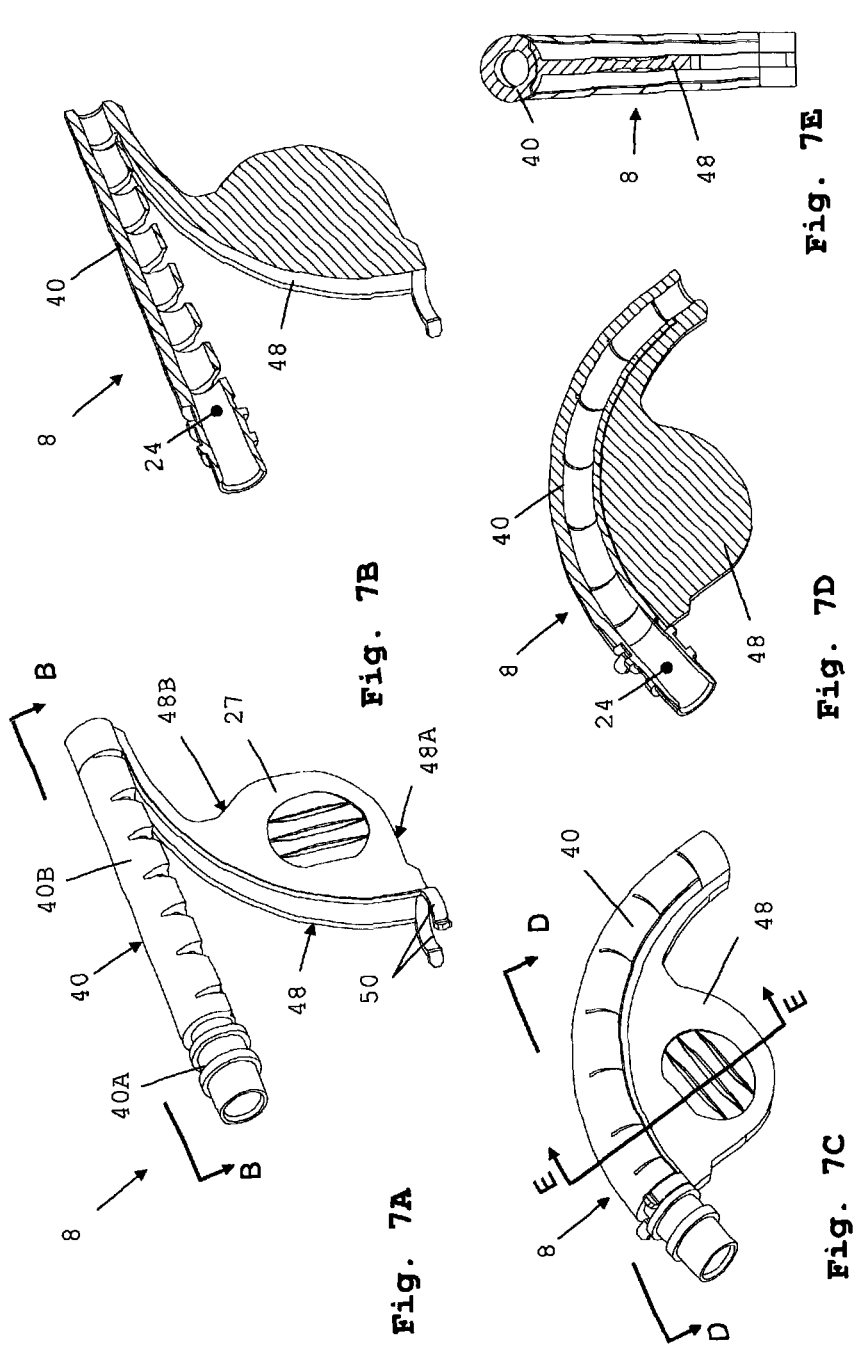

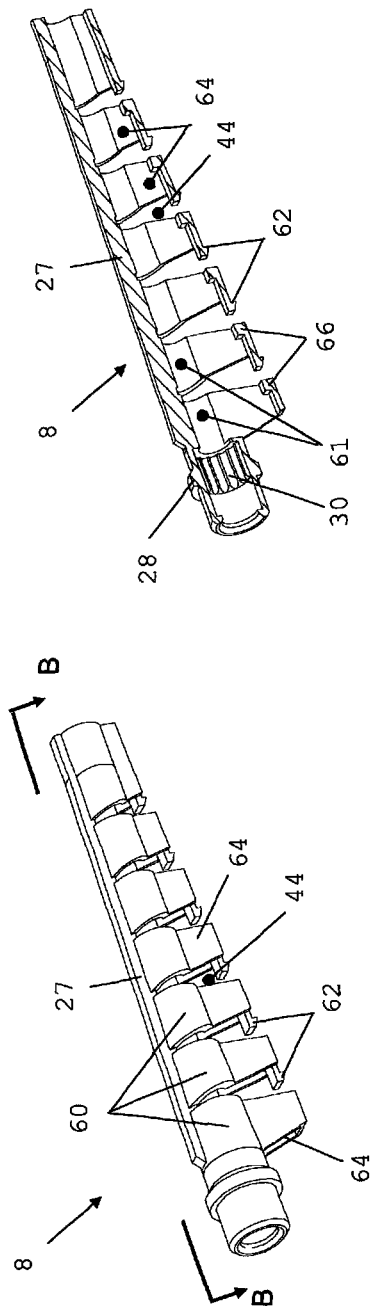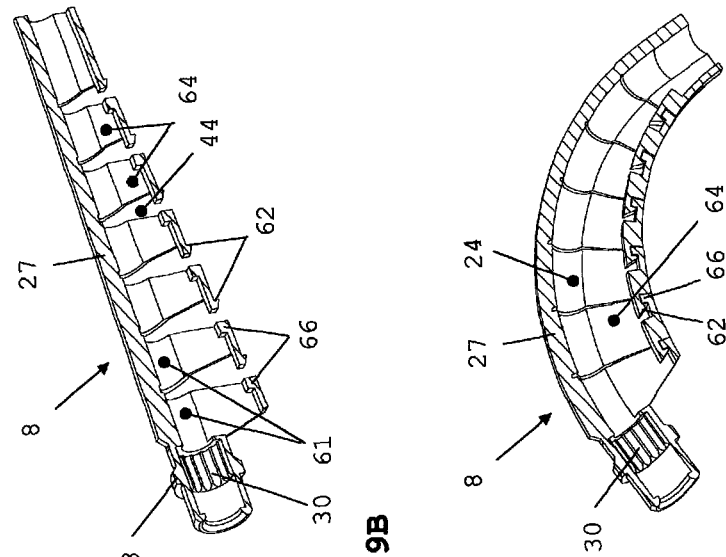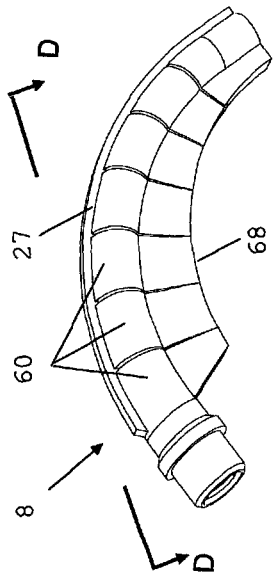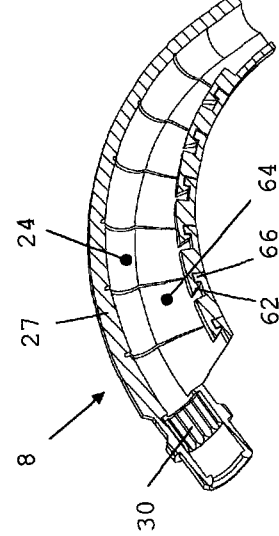

CABLE GUIDE BOOT ASSEMBLY

TECHNICAL FIELD

The present disclosure relates to a cable guide boot assembly, in particular for guiding a cable in a desired direction with respect to a connector. A method is also provided.

BACKGROUND

Signal cables, in particular optical cables and/or flat cables having plural electrically conductive and/or optical signal strands adjacent each other, may be delicate and may require protection against kinks, sharp bends and/or twists which could reduce signal quality and/or even damage the strands. The risk of such kinks, sharp bends and/or twists in a cable is generally highest at or near the connection of the cable to a (cable) connector.

It is known to protect such cables by (semi-)rigid cable guide boots, which define a channel for guiding a cable in a bending and/or twisting angle that is considered acceptably safe for the cable. A particular example is use of guide boots in junction boxes where plural cable connectors are connected adjacent each other and where the cables are guided over about 90 degrees bending angle, so that space between a panel carrying plural connectors and another object, e.g. a wall or a door, may safely be reduced to a minimum.

To allow connecting and disconnecting cable connectors in a crowded junction box, it is desired that guide boots are provided which are adjustable and/or removable.

Thus, a desire exists for a guide boot that on the hand can provide adequate protection for a cable and on the other hand provide flexibility for granting access to the cable that is guided, a connector associated with the cable and/or adjacent equipment such as further cables, connectors etc.

SUMMARY

In a first aspect, a cable guide boot assembly is herewith provided for attachment to a connector and guiding a cable. The guide boot assembly comprises a first boot portion and a second boot portion. The first and second boot portions are attachable and/or attached to each other with a first coupling and a second coupling. When coupled with both first and second couplings, at least in the first coupling a portion of the first boot portion is received in a portion of the second boot portion and a curved channel portion is provided for guiding the cable with a predetermined bending radius through the cable guide boot assembly.

The first and second couplings may be arranged remote from each other along the first and/or second boot portions, in particular towards opposite ends of the first and/or second boot portions. Due to the first and second couplings, a particular relationship between the first and second boot portions with respect to their relative position and their direction of extension may be reliably established, and thus the bending radius of the channel portion defined by the boot assembly may be reliably established by attaching the first and second boot portions together.

The first and/or second boot portions and/or the first and second boot portions together may define an enclosed channel portion, to provide protection to the cable on all sides thereof along at least a portion of the cable.

The bending radius may be selected to suit one or more types of cables.

In an embodiment, at least one of the first and second couplings comprises a snap-fit coupling. Such assembly facilitates arranging the boot in the predetermined bending radius. The snap-fit coupling may provide an audible and/or tactile detectable click to indicate correct coupling.

In an embodiment, at least one of the first and second couplings is decouplable. Such assembly facilitates adjustment to the boot assembly, to the cable that is guided, to a connector associated with the cable and/or to adjacent equipment.

In an embodiment, the first and second boot portions are detachably coupled to each other. Such assembly facilitates (partial) disassembling of the guide boot, improving access equipment associated with the assembly. Further, the assembly may be generally modular, which facilitates optimising the first and second boot portions to particular desires, e.g. manufacture from different materials and/or with different manufacturing techniques.

In an embodiment, the first and second boot portions are an integrated object. Such assembly facilitates use, since losing one portion of the guide boot assembly is prevented, also the first and second portions may be pre-aligned for appropriate coupling. The first and second boot portions may be manufactured as separate objects that are (semi-)permanently coupled and/or integrated afterward, e.g. with a hinge and/or by measures such as by gluing, welding, overmoulding, etc.

In another assembly the first and second boot portion may be unitary, which may facilitate manufacturing, e.g. by moulding techniques.

In an embodiment, at least the first boot portion (40) is relatively flexible and the second boot portion (48) is relatively rigid. In such an assembly the relatively flexible first boot allows moving the cable when the first and/or second coupling are uncoupled while at the same time providing some protection for the cable by the first guide boot portion. The relative rigidity of the second boot portion increases the protection to the level desired for the boot assembly in the coupled state of the first and second couplings.

In an embodiment, at least a portion of the channel extends along at least the first boot portion and the first and second couplings are arranged at or near opposite ends of the channel in the first boot portion. Such assembly facilitates accurately defining the bending radius of the channel of the first boot portion.

In an embodiment, in the coupled situation of the second coupling at least a portion of the first boot portion is received in a portion of the second boot portion. In such an assembly the portion of the first coupling in which a portion of the first boot portion is received in a portion of the second boot portion provides additional fortification of the first boot portion. Further, accessing the coupling from the outside of the guide boot is facilitated. Also, changes in the shape, strength and/or flexibility of the first boot along its length may be reduced or prevented, which may in particular be desirable in a boot assembly in which at least the first boot portion is relatively flexible and the second boot portion is relatively rigid.

A method of orienting a cable may, in accordance with the first aspect above, comprise the steps of
- connecting a cable to a connector, such that the cable extends from the connector in a first relative direction;
- providing a guide boot assembly of any one of the preceding claims;
- accommodating at least a portion of the cable in at least a portion of the channel of the first boot portion;
- coupling the first and second couplings of the guide boot assembly and therewith providing a curved channel through the cable guide boot assembly and bending the cable in a predetermined bending angle.

In a further aspect, a cable guide boot assembly is provided, which comprises a boot portion and a connector portion. Such cable guide boot assembly may comprise a cable guide boot assembly as described above. The connector portion is non-rotary fixed to the connector and extends from the connector in a first direction relative to a mating direction of the connector and comprises a first connection portion having a non-circular circumferential shape relative to the first direction. The boot portion, e.g. at least one of the first and second boot portions of a cable guide boot assembly as described above, comprises a second connection portion mated to the first connection portion, the second connection portion being configured to receive the first connection portion, such that the boot portion is attachable to the connector portion in a discrete number of twisting angles with respect to the first relative direction.

In such cable guide boot assembly, the cable to be guided may be guided in a number of predetermined twisting angles, e.g. in steps of 30 or 45 degrees around the first direction. Predetermined twisting angles facilitate providing a predictable and reliable layout of the cables and assist preventing accidental twisting to a potentially unacceptable twisting angle, e.g. in view of signal quality and/or cable damage.

To define the twisting angles the first and second connection portions may comprise mated shapes comprising, e.g. a plurality of protrusions and/or recesses such as bumps, ribs, keys and/or regular or irregular polygonal shapes in cross section perpendicular to the first direction.

The boot portion receiving the connector portion provides a relatively cost-efficient assembly, since the connector portion may be a single-walled object, e.g. a tubular extension and/or a portion of a connector housing.

Further, the assembly may be relatively robust, since the assembly may be generally massive, since in the connector portion, hollow portions between wall portions for receiving the boot portion are obviated. Also, a connector provided with the connector portion of the assembly may be smaller and/or more accessible when the boot portion is not (yet) attached, compared to a connector having a connector portion for receiving a boot portion.

The connector portion may comprise a sleeve portion such as an overmoulded extension or a tubular extension of a connector housing or a connector shield, facilitating manufacture and design of the assembly.

Such sleeve portion may be a separate object. This facilitates providing the connector, the connector portion and the boot portion as an assembly of separate modules wherein each module may be optimised for different purposes. E.g., the connector portion may comprise a crimping portion, e.g. a crimping ferrule. The crimping method may define a portion of the non-circular cross section of the first connection portion. Crimping also is an effective way of connecting the shield of a shielded cable to a connector shield.

Advantageously, the first and second connection portions are detachably connectable. This allows adjustment of the twisting angle by (partial) disconnecting the boot portion from the connector portion and reconnecting in another twisting angle.

The cable guide boot assembly may be of the above-described type having a first and a second guide boot portion, wherein the connector portion may be integrated in the first boot portion as a single object, e.g. a unitary object. In such case the second boot portion may comprise the second connection portion.

A method of orienting a cable may comprise the steps of providing a guide boot assembly according to the description of the further aspect above, fitting the boot portions over the connector portion in one of a discrete number of twisting angles with respect to the first direction thereby arranging the channel for receiving and guiding the cable in a predetermined twisting angle.

Where the cable guide boot assembly comprises a connector portion in the form of a sleeve portion, the method may comprise fixing the connector portion to a connector.

A cable guide boot may comprise one or more portions for defining a twisting angle of the cable to be guided relative to at least one portion of the guide boot assembly, e.g. comprising one or more portions of the channel with a narrow and/or non-circular cross section to determine an orientation of the cable within at least such portion of the channel.

BRIEF DESCRIPTION OF THE DRAWINGS

The above-described aspects will hereafter be more explained with further details and benefits with reference to the drawings showing an embodiment of the invention by way of example.

FIGS. 3A-3B show a fiber patch cable comprising on opposite sides assemblies comprising a guide boot assembly and a cable connector;

FIG. 3C shows a cable guide boot portion of FIGS. 3A-3B;

FIG. 4A shows a cable guide boot portion;

FIGS. 4B-4C are different cross-section views of the boot portion of FIG. 4A, as indicated in FIG. 4A;

FIGS. 4D-4E show two forms of a cable guide boot portion for use with the a cable guide boot portion of FIG. 4A;

FIG. 4F shows an assembly of the boot portions of FIGS. 4A and 4E;

FIG. 5A shows a cable guide boot portion;

FIG. 5B is a cross-section view of the boot portion of FIG. 5A, as indicated in FIG. 5A;

FIGS. 5C-5D show two forms of a cable guide boot portion for use with the a cable guide boot portion of FIG. 5A;

FIGS. 5E-5F show an assembly of the boot portions of FIGS. 5A and 5D in two arrangements;

FIG. 6A is an exploded view of a cable guide boot assembly;

FIG. 6B shows a cable guide boot of the assembly of FIG. 6A;

FIGS. 6C-6D show the cable guide boot of FIG. 6A in perspective view and cross-section view, respectively;

FIGS. 7A-7E, 8A-8C and 9A-9D, respectively, show various views of further embodiments in different arrangements.

DETAILED DESCRIPTION OF EMBODIMENTS

Figure 1:
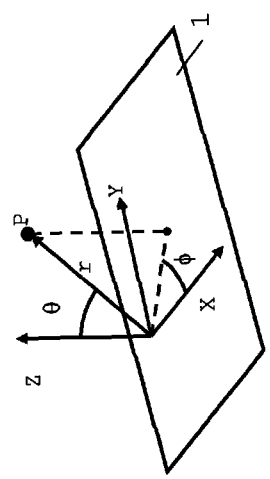
FIG. 1 shows a reference coordinate system.

It is noted that the drawings are schematic, not necessarily to scale and that details that are not required for understanding the present invention may have been omitted. The terms "upward", "downward", "below", "above", "front" and "rear" and the like relate to the embodiments as oriented in the drawings, and are for clarification purposes only without implications to a particular direction or orientation, unless otherwise specified. Further, elements that are at least substantially identical or that perform an at least substantially identical function are denoted by the same numeral, where useful further individualised with alphabetic suffixes.

FIG. 1 shows a reference coordinate system which will be adhered to in this disclosure. The position of any point P may be defined in Cartesian coordinates X, Y, Z, in cylindrical coordinates r, φ, Z, and/or in spherical coordinates r, φ, θ.

FIG. 1 shows a reference plane 1 corresponding with an XY plane, which may correspond to a panel into which a connector is to be plugged. The angle θ indicates a bending direction and the angle φ indicates a twisting angle.

A cable may be both twisted and bent. In case of a bent cable, twisting of a cable refers to a rotation about the longitudinal direction of the cable and bending refers to a deflection from a straight cable in a direction perpendicular to the longitudinal direction of the cable.

FIGS. 2A-2F show (details of) a connector assembly 2 comprising a connector 4, attached to a cable 6 and further comprising a cable guide boot assembly 8.

The connector 4 is a cable connector and comprises a connector body 10 (partly shown) and a connector housing 12A-12B. Here, the connector body 10 comprises a barrel 14 for receiving at least a portion of the cable 6 and defining an initial direction of extension (Z) of the cable 6 from the connector 4.

The cable 6 comprises one or more leads (not shown in FIGS. 2A-2F) e.g. for power or data transmission, which here extend through the barrel 14 and which are connected to one or more suitable terminals (not shown in FIGS. 2A-2F) of the connector 4. Best seen in FIG. 2A, the cable 6 comprises an optional shielding 16, e.g. a braid, and a cladding or sheath 18. The cable 6 is non-rotary fixed to the connector body 10.

Figure 2B:
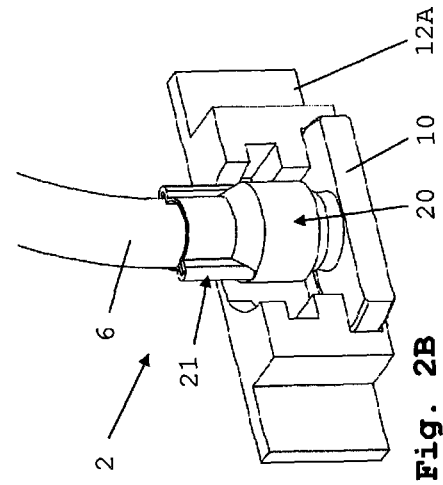
FIGS. 2A-2F are various views of a first assembly comprising a guide boot assembly and a cable connector, FIGS. 2C and 2D only showing a cable guide boot portion.
Figure 2A:
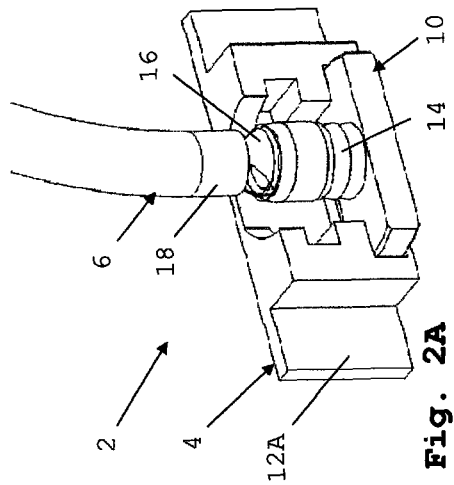

A crimping ferrule 20 is arranged over the cable (shielding 16 and sheath 18) and is crimped to the barrel 14 (FIG. 2B). This fixes the cable 6 to the connector body 10 and prevents (twisting) rotation of the cable 6 about the barrel 14. The crimped ferrule 20 is provided with a connection portion 21 having a non-circular circumferential shape relative to the direction of extension (Z) of the barrel 14 and the cable 6, here being due to the crimping. In FIG. 2B the ferrule 20 is crimped in a so-called "ear-crimp" or "wing crimp", providing the connection portion 21 with a number of protruding ribs, but a star crimp, a hexagonal crimp, a line crimp or any other technique for and/or providing a connection portion having a non-circular cross circumferential shape in cross section may be employed.

Figure 2D:
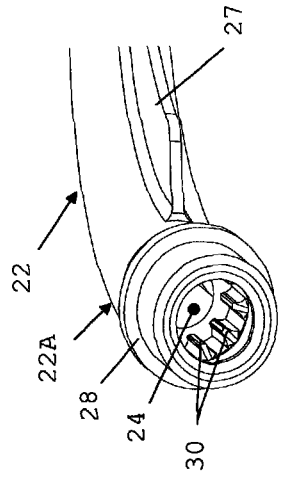
Figure 2F:
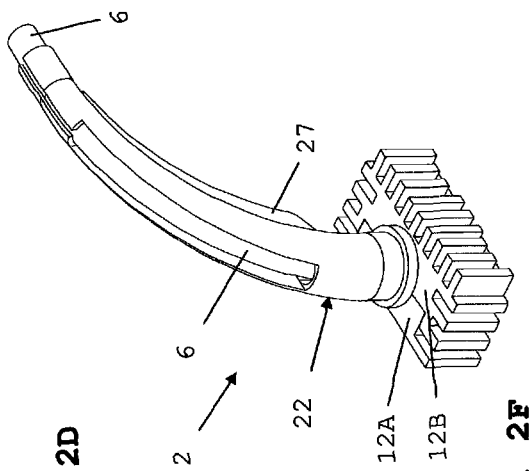
Figure 2C:
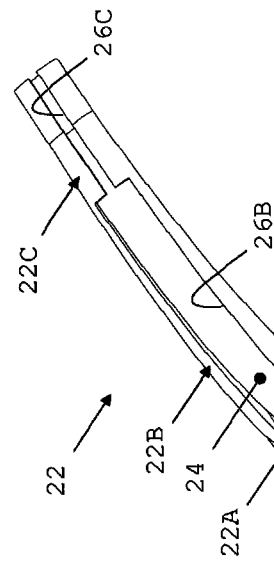

FIGS. 2C-2D show a cable guide boot portion 22 of the boot assembly 8. The boot portion 22 is generally hollow, having a lumen defining a channel 24 for receiving and guiding a portion of the cable 6 through it. The boot portion 22 is generally curved in a predetermined arc, here extending over about 90 degrees bending angle, and is substantially rigid, semi-rigid or somewhat flexible, e.g. metallic, plastic, artificial rubber, etc, to prevent sharp bends or kinks of a cable portion received in the boot portion 22. A semi-rigid and resilient boot portion 22 may deform slightly under force and veer back upon removal of the force. This extends life time and general robustness of the boot. Also, it prevents potentially damaging forces on (a barrel 14 of) a connector 4 to which the boot portion 22 is attached.

The boot portion 22 comprises a front section 22A, a middle section 22B and a rear section 22C. In the shown embodiment, the front end 22A is tubular with a closed circumferential wall, the middle section 22B and the rear section 22C have a generally C-shaped wall, providing openings 26B, 26C through the wall. The opening 26B in the middle section 22B is larger than the opening in the rear section 22C, providing a window in the middle section 22B, as it were. A stiffening rib 27 extends along the boot portion 22, here only along the middle section 22B. The stiffening rib 27 extends radially inward with respect to the bending curvature of the boot portion 22 (FIGS. 2D-2F).

The front section 22A has an exterior circumferential rib 28. The front section 22A has a non-circular interior shape in cross section perpendicular to the (local) direction of extension of the boot section 22, due to a plurality of structures protruding into the lumen. Here, best seen in FIG. 2D, the structures are ribs 30 arranged on an inner wall of the boot section and extending substantially axially along the boot section 22.

Figure 2E:
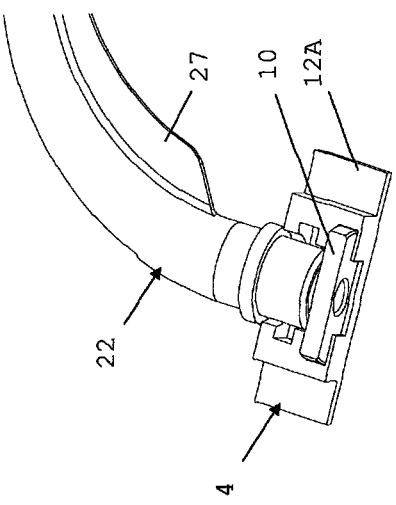

The boot 22 is attachable to the connector 4, with the front section 22A being configured to receive the cable 6 and to receive the crimping ferrule 20 (FIGS. 2E-2F). In such attached situation, the outward extending ribs 21 of the ferrule 22 and the interior ribs 30 of the boot section 22 mate and interfere, preventing twisting of the boot portion 22 with respect to the connector body 10 when attached together. Due to the arrangement of interior ribs 30, the boot portion 22 is attachable to the ferrule 20, and thus to the connector body 10, in a discrete number of twisting angles φ with respect to (the direction of extension Z of the cable 6 from) the connector 4. As shown in FIGS. 2E-2F, the (front section 22A of the) boot 22 may fit in a portion of the connector 4. In an embodiment, not shown, the boot portion 22 may be secured to the connector 4, e.g. one or more optional securing features of the connector housing portions 12A, 12B, may be provided, e.g. gripping onto the circumferential rib 28 (not shown).

Advantageously, the interior size and shape of the channel 24 in the boot section 22, at least in the front section 22A, and the exterior size and shape of the cable 6 are chosen such that at least a portion of the boot 22 and the cable 6 are freely rotatable about each other in the twisting direction. Thus, the boot 22 may be attached to the connector 4 in a desired twisting position, without exerting a torsion force onto at least a portion of the cable 6.

The width of the openings of the middle and rear sections 22B, 22C, may be chosen. Preferably, the cable fits easily through the window 26B in the middle section 22B but may be held by the C-shaped wall of the rear section 22C. The cable 6 can, before, or in particular after attaching the boot 22 to the connector 4, be arranged into the channel 24 via the openings 26B, 26C, of the middle and rear sections 22B, 22C, of the boot portion 22. When the cable 6 is held to extend substantially straight from the connector 4, and is not retained in the rear section 22C of the boot portion 22, the boot 22 may be detached from (the ferrule 20 of) the connector and may be freely rotated and re-attached to the connector 4 in another predetermined twisting angle, without torsion of the cable 6. The cable 6 can then be arranged back into the channel 24 by fitting it into the rear portion 22C via the opening 26C with only a bend or with a desired amount of twisting. The rear section 22C and rear opening 26C may be formed such that the cable may be snapped into the rear portion 22C, e.g. by providing the rear portion 22C with suitably shaped lead-in bevels, chamfers and/or arms for guiding the cable 6 into the rear opening 26C and the rear portion 22C.

FIGS. 3A-3B are explosion views of an embodiment of a substantially symmetric fiberoptic patch cable 6, the cable having fiberoptic leads 31 and having two substantially identical connector assemblies 4 on its opposite ends. Each connector 4 comprises a connector body 10. A strain relief portion 32 is fixed non-rotary to the connector body 10 and extends rearward from it along (the direction Z of extension of) the cable 6, opposite from the respective connecting directions C of the respective connector assemblies 4. The strain relief portion 32 has a connection portion 34 having a non-circular circumferential shape relative to the direction of extension Z of the cable 6 at the connector body 10 due to a plurality of facets, e.g. four, six (shown), eight or twelve. A rear portion 36 of the strain relief portion 32 is substantially flexible.

FIG. 3C is a perspective view of the cable guide boot portion 22 of FIG. 3B. Similar to the boot portion 22 of FIGS. 2A-2F, this boot 22 is generally rigid and curved, providing a curved channel 24 that is bent over about 90 degrees. Different from the guide boot 22 of FIGS. 2A-2F, the boot portion 22 of FIGS. 3B-3C the middle section 22B comprises two generally C-shaped portions that are open to opposite lateral sides (best seen in FIG. 3B). This facilitates manufacture of an open construction by moulding, reduces material consumption and allows access to the channel 24 and a cable 6 received in it. Further, the rear portion 22C is tubular having a closed wall without an opening 26C. This boot portion 22 is provided with two stiffening ribs 27 extending along the middle section 22B, one extending radially inward and one extending radially outward with respect to the bending curvature of the boot portion 22 (FIG. 3B).

Like the boot portion 22 of FIGS. 2A-2F, the front portion 22A of FIGS. 3B-3C is tubular and comprises inward protruding interior ribs 30. Thus, the front section 22A is mated to (the exterior shape of) the connection portion 34 of the strain relief portion 32. In particular, the front section 22A is configured to receive and be detachably attachable to the connection portion 34 of the strain relief portion 32 in a discrete number of twisting angles $\phi$ with respect to the connector 4 and the cable 6 extending therefrom (direction Z). The different selectable twisting angles $\phi$ are determined by interplay of the interior ribs 30 and the facets of the connection portion 34 of the strain relief portion 32.

The cable 6 is freely rotatable about its longitudinal axis inside (the channel 24 of) the boot portion 22 so that, when detached from the connector 4, the boot portion 22 may be arranged in a different predetermined twisting angle with respect to the connector 4 without forcing torsion of the cable 6. Thus, an effective twisting angle $\phi$, and a resulting effective direction of extension of the cable 6 from the connector 4 rearward from each boot portion 22, may reliably be defined without risking harm to the cable 6.

As indicated, the boot portions 22 of FIGS. 2A-3C are (semi-)rigid having a substantially fixed bending radius and angle, forceful deformation not considered. Such predetermined bending angle may not be desired in some applications, e.g. where a straight cable is preferred, where there is little room for twisting a bent boot 22, and/or where a bent boot 22 may interfere with connecting and/or assembling a connector 4 and/or an assembly of a connector 4 and an associated guide boot 22. The cable guide boot assembly 8 of FIGS. 4A-4F addresses such problems.

This boot assembly 8 comprises a first boot portion 40 (FIGS. 4A-4C) and a second boot portion 42 in the form of a stiffener or stay 42 (FIGS. 4D-4E). The boot portion 40 is a generally tubular object which defines a channel 24 for receiving and guiding a cable 6 (not shown). The boot portion 40 comprises a front section 40A, a middle section 40B and a rear section 40C. As before, the front section 40A is configured to be attached to a mated non-circular connecting portion (not shown) of a connector and/or of another portion of the guide boot assembly 8 (both not shown) and it comprises interior ribs 30, visible in FIG. 4B, for defining twisting angles $\phi$. The middle section 40B is generally flexible and comprises a plurality of optional radial cuts 44 to increase the flexibility. A sleeve 46 extends along the middle section 40B.

The stay 42 comprises an elongated body portion 42A and an optional gripping portion 42B, which here is formed disk- or spoon-like tab, but any other form e.g. a ring shaped is conceivable. The stay 42 is a substantially shape retaining object, which may be deformable or rigid e.g. metal, hard plastic or composite material.

The body portion 42A of the stay 42 and the sleeve 46 of the boot portion 40 are formed such that the stay may be inserted and maintained in the sleeve 46 (FIG. 4F) to provide an assembled boot assembly 8. The gripping portion 42B facilitates removal of the stay from the boot portion 40.

The stay 42 may be manufactured in straight form, as shown in FIG. 4D, but in use is preferably curved to define a bending angle of the boot assembly 8. In an embodiment, the stay 42 is deformable by moderate force so as to define varying curvatures of the boot assembly 8, e.g. being bendable by hand without tools, but resisting bending under the influence of resiliency of the boot portion 40, such that a desired bending angle may be set and maintained thereafter. However, it is preferred that the stay 42 be substantially rigid to define a predetermined bending angle. In such case, for different bending angles, a stay 42 of one predetermined bending angle may be replaced with a stay 42 defining another predetermined bending angle.

FIGS. 5A-5F show another boot assembly 8 comprising a first boot portion 40 and a second boot portion 48. The first boot portion 40 is similar to the first boot portion of FIGS. 4A-4F, however lacking a sleeve 46 and having optional radial cuts 44 on two opposite sides. The second boot portion 48 is of similar construction to the stay 42 of FIGS. 4A-4F, being a substantially shape retaining object, which may be deformable by a force larger than resiliency of the first boot portion or rigid e.g. metal, hard plastic or composite material. The second boot portion 48 comprises a front section 48A, a middle section 48B and a rear section 48C, which here is substantially identical to the front section 48A.

The front and rear sections 40A, 40B and 48A, 48B of the first and second boot portions 40, 48, respectively are arranged as first and second couplings for attaching the boot portions 40, 48, wherein the front and rear sections 48A, 48C of the second boot section 48 receive the front and rear sections 40A, 40B of the first boot section 40 by being bent around them (FIGS. 5D-5F). The resulting shape of the second boot portion 48 is shown most clearly in FIGS. 5D-5F. The front and rear sections 48A, 48B, may be formed differently, to facilitate coupling of the first boot section 40 therein.

When assembled and coupled with both couplings at the front and rear sections 40A, 48A; 40C, 48C, the guide boot assembly 8 provides a curved channel 24 for guiding the cable with a bending radius and bending angle that is defined by the second boot portions 48. Upon decoupling one coupling, e.g. at the front sections as shown in FIG. 5E, the first boot portion 40 may be bent straight and thus be arranged in another twisting angle $\phi$ with little or no twisting stress on a cable and/or with reduced interference with nearby objects.

The second boot portion 48 need not be curved and may be substantially straight, but having a shorter length than the middle section of the first boot portion 40, pulling the front and rear sections 40A, 40C, together like a bow and a bowstring.

FIGS. 6A-6D show another guide boot assembly 8. This assembly also comprises a first boot portion 40 and a second boot portion 48. The first boot portion 40 here is a generally flexible tubular object with a closed wall, but it may comprise cuts and/or windows. The second boot portion 48 is a substantially (semi-)rigid object resembling the boot portion 22 of FIGS. 2A-2D and having a tubular front section 48A, a generally C-shaped middle section 48B with a relatively wide opening 26C and a generally C-shaped rear section 48C with a relatively narrow opening 26C. The second boot portion 48 also comprises a stiffening rib 27 and it may comprise a non-circular interior circumference, e.g. interior ribs 30 to define distinct twisting angles φ (not shown).

For assembling this assembly 8 and defining a predetermined bending angle, the first boot portion 40 is inserted from the rear into the front section 48A of the second boot portion 48 to provide a first coupling of the boot portions 40, 48 (FIG. 6A). To establish a bending radius and –angle defined by the second boot portion 48, (the rear section 40C of) the first boot portion 40 is also coupled with the rear section 48C of the second boot portion 48. The rear section 48C comprises outward extending arms 50 for guiding the first boot section 40 into the rear portion 48C so as to provide an easy snap-coupling, which is detachable (FIGS. 6C-6D).

The C-shaped middle section 48B provides a sideways stability to (the middle section 40B of) the first boot section 40.

FIGS. 7A-7E show a guide boot assembly 8 comprising a first boot portion 40 and a second boot portion 48, which are attached together, here being integrated into a unitary object.

The first boot portion 40 comprises a front section 40A, which may comprise interior ribs and/or other means to provide a non-circular interior cross sectional shape, and it comprises a middle section 40B which in turn comprises a plurality of optional radial cuts 44 and is flexible.

The second boot portion 48 comprises a front section 48A having a generally C-shaped wall providing a snap-coupling to the front section 40A of the first boot section 40. The second boot portion 48 further comprises a C-shaped middle section comprising a stiffening rib 27 which is enlarged to provide a gripping portion. In the shown boot assembly the rear sections of both boot portions 40, 48 coincide.

In use, to facilitate defining a twisting angle of the boot assembly 8 and a cable received in the boot assembly 8 and/or to facilitate access to one or more objects adjacent the assembly, the coupling between (the front sections 40A, 48A of) the first and second boot portions 40, 48, towards the front side of the assembly 8 may be detached. The first boot portion 40 may be bent over a bending angle defined by the second boot portion 48 by (re-)attaching the coupling of the front sections 40A, 48A.

Figure 8B:
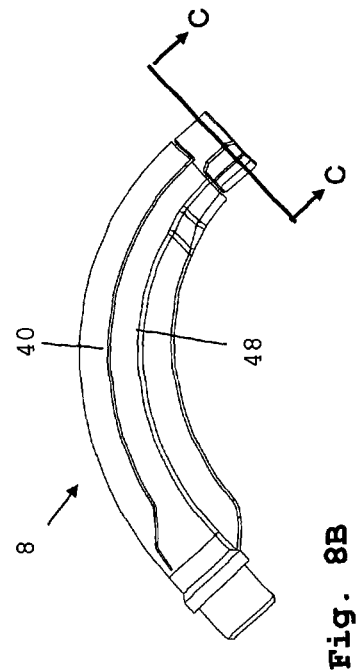
Figure 8C:
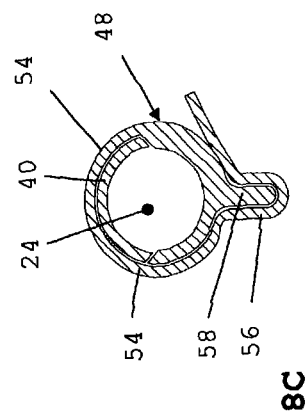
Figure 8A:
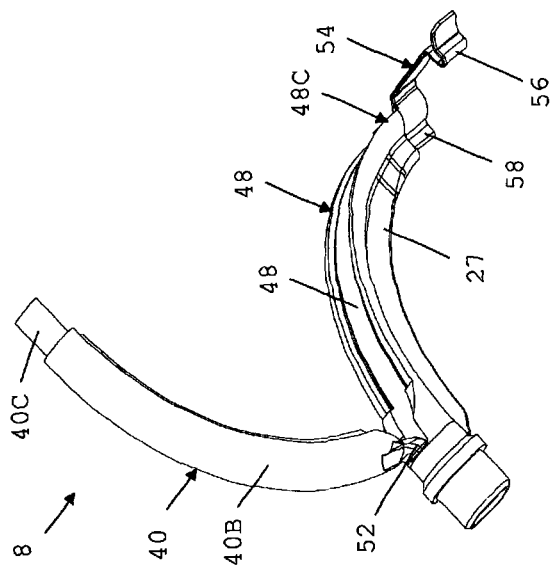

FIGS. 8A-8C show another guide boot assembly 8, comprising a first boot portion 40 and a second boot portion 48, which are hingingly attached to each other near the front side of the boot assembly 8. Here, the hinge 52 is formed by a flexible portion and the first and second boot portions 40, 48, are an integrated object, possibly unitary. The front section of second boot portion 48 comprises a tubular portion 48A, which is configured for attachment to a connection portion of a further object, e.g. a connector portion or a further portion of the guide boot assembly 8 (not shown), and which may comprise a non-circular interior circumferential shape preventing rotation between predetermined twisting angles. Here, both first and second boot sections comprise a generally C-shaped middle section 40B, 48B. The rear section 40C of the first boot portion 40 is also generally C-shaped. The rear section 48C of the second boot portion 48, however, comprises an elongated flexible strap 54 having a first fastener 56. The rear portion 48C also comprises a second fastener 58 mated to the first fastener 56. The rear sections 40C and 48C are couplable together by arranging the respective rear sections 40C, 48C against each other and fastening the strap 54 around both of them, such that the first boot portion 40 is received by and attached to the second boor portion 48 (FIGS. 8B-8C). The first and second fasteners here comprise a protrusion (58) and a matching recess (56), but other fasteners, e.g. a snap fastener, a hook-and-loop type fastener (e.g. Velcro®), may be employed.

Different from the other boot assemblies shown, when the coupling at the rear is decoupled (FIG. 8A), this boot assembly 8 only forms an enclosed channel portion at the front side of the boot assembly 8. Towards the rear side of the guide boot a channel is absent, both first and second boot portions merely forming half-shells to provide an enclosed curved channel 24 upon coupling of the rear portions 40C, 48C.

The wall thicknesses of the first and second boot portions 40, 48, may vary along the boot assembly. E.g., the rear section 40C of the first boot portion 40 may be reduced such that the combined thickness of the first boot portion 40 and the strap 54 at that point are substantially equal to the wall thickness of an adjacent section of the first and/or second boot portions 40, 48.

FIGS. 9A-9D show another cable guide boot assembly 8, comprising a plurality of boot portions 60 adjacent each other along the direction of extension of the boot assembly 8, which are separated by radial cuts, providing the boot portions with a tapering shape. Each boot portion comprises a lumen 61 for receiving and guiding a cable portion. The boot portions 60 are attached to a longitudinal rib 27 or spine, which is somewhat flexible such that adjacent boot portions 60 are hingingly coupled together and together form a channel 24 for receiving and guiding a portion of a cable.

Each boot portion 60 comprises at least a second coupling portion, here in the form of a latching barb 62 and a mated receptacle 64 with a latching edge 66 on an opposite side of the boot portion 60 with respect to the spine 27. Two adjacent boot portions 60 may be coupled together opposite the spine 27 by rotating the boot portions 60 towards each other about the hinge. Then, the latching barb 62 of the one boot portion 60 is received in the mated receptacle 64 of the adjacent boot portion 69 and engages the latching edge 66, e.g. snapping behind it, therewith establishing a second coupling between the adjacent boot portions 60 (best seen in FIG. 9D). Thus coupled together, adjacent boot portions 60 define a portion of a curved channel 24 for receiving and guiding a cable (not shown). In the shown embodiment, when all boot portions 60 are coupled with their respective adjacent boot portions 60 the boot assembly 8 defines a channel 24 that is curved in a bending angle over about 90 degrees (FIGS. 9C, 9D). It is noted that the boot assemblies 8 of FIGS. 9A-9B and 9C-9B have slightly different coupling members 62-66. In FIGS. 9A-9B the coupled boot portions 60 would provide a saw-tooth-shaped edge on its radial inside edge with respect to the bending angle (not shown) whereas the boot portion of FIGS. 9C-9D provides a smooth radial inside edge 68.

Decoupling of adjacent boot portion in the shown embodiment may readily be performed by lateral squeezing a boot portion 60 on opposite sides, substantially perpendicular to the plane of the FIGS. 9A-9D, between the rib portion 27 and the snap-coupling portion 62-66. Thus, the squeezed boot portion 60 is deformed whereby receptacle 64 is pushed away from the spine portion 27 and the latching edge 66 is pushed away from the barb 62, such that the two are disengaged from each other. The latched coupling between a number of boot portions 60 may thus be decoupled by successive pinching of the boot portions 60, which may be done in a single swiping motion along the desired section of the boot assembly 8.

It is noted that the boot assemblies of the FIGS. 7A-7E and 9A-9D may be arranged in a curved state to a predetermined bending radius through the cable guide boot assembly, by coupling the respective first and/or second couplings. However, when decoupled, at least the first boot portion of each assembly may provide a substantially straight strain relief and/or guide boot. Similar holds for the assemblies of FIGS. 4A-4F when (at least partly) disassembled.

The invention is not restricted to the above described embodiments which can be varied in a number of ways within the scope of the claims. For instance, different bending radii may be employed. Different lengths may be used. The channel may be shaped differently, e.g. for receiving a flat cable. A guide boot may comprise plural coupling portions for providing different predetermined bending angles.

Elements and aspects discussed for or in relation with a particular embodiment may be suitably combined with elements and aspects of other embodiments, unless explicitly stated otherwise.

The invention claimed is:

1. A cable guide boot assembly for attachment to a connector and guiding a cable comprising a boot portion and a connector portion,
   wherein the connector portion is configured to be non-rotary fixed to the connector and to extend from the connector in a first direction relative to a mating direction of the connector, and comprises a first connection portion having a non-circular circumferential shape relative to the first direction;
   wherein the boot portion comprises a second connection portion mated to the first connection portion,
   wherein the second connection portion is configured to receive the first connection portion, such that the boot portion is attachable to the connector portion in a discrete number of twisting angles with respect to the first relative direction, and
   wherein the connector portion comprises a strain relief portion having a connection portion and a rear portion, wherein the connection portion is proximate the connector portion and wherein the rear portion is configured to be proximate the cable, wherein the rear portion extends inside the boot portion.

2. The cable guide boot assembly according claim 1, wherein the boot portion provides a curved channel portion for guiding the cable with a predetermined bending radius through the cable guide boot assembly.

3. The cable guide boot assembly according to claim 1, wherein the first connection portion and the second connection portion comprise mated shapes in cross section perpendicular to the first direction.

4. The cable guide boot assembly according to claim 1, wherein the first connection portion and the second connection portion are detachably connectable.

5. The cable guide boot assembly according to claim 1, wherein the connector portion comprises a sleeve portion such as a crimping portion for crimping onto a corresponding portion of the connector, an overmoulded extension or a tubular extension of a connector housing or a connector shield.

6. The cable guide boot assembly according to claim 1, wherein at least a portion of the connector portion is relatively flexible and the boot portion is relatively rigid.

7. The cable guide boot assembly according to claim 2, wherein the boot portion comprises a first boot portion and a second boot portion,
   wherein the first and second boot portions are at least one of attachable and attached to each other with a first coupling and a second coupling, and wherein preferably the first and second couplings are at or near opposite ends of the channel in the first boot portion.

8. Cable guide boot assembly according to claim 7, wherein at least one of the first and second couplings is decouplable.

9. Cable guide boot assembly according to claim 7, wherein at least the first boot portion is relatively flexible and the second boot portion is relatively rigid.

10. Cable connector assembly comprising a connector, in particular an optical connector, and a cable guide boot assembly according to claim 1.

11. Cable having substantially identical connector assemblies and cable guide boot assemblies according to claim 1 on its opposite ends.

12. A method of orienting a cable comprising the steps of connecting a cable to a connector, such that the cable extends from the connector in a first relative direction;
   providing a guide boot assembly according to claim 1,
   fitting at least the boot portion over the connector portion in one of a discrete number of twisting angles with respect to the first direction thereby arranging a channel for receiving and guiding the cable in a predetermined twisting angle.

13. A method of orienting a cable, in particular the method according to claim 12, comprising the steps of:
   providing the guide boot assembly wherein the boot portion comprises a first boot portion and a second boot portion, wherein the first and second boot portions are at least one of attachable and attached to each other with a first coupling and a second coupling, and wherein preferably the first and second couplings are at or near opposite ends of the channel in the first boot portion;
   accommodating at least a portion of the cable in at least a portion of the channel of the first boot portion;
   coupling the first and second couplings of the guide boot assembly and therewith providing a curved channel through the cable guide boot assembly and bending the cable in a predetermined bending angle.

* * * * *